United States Patent [19]

Nishimura

[11] 3,949,303

[45] Apr. 6, 1976

[54] TIME CONTROLLED SWITCHING ARRANGEMENT FOR TWO TIMER RADIO RECEIVER

[75] Inventor: Yoshinori Nishimura, Tanashi, Japan

[73] Assignee: Sony Corporation, Tokyo, Japan

[22] Filed: Oct. 9, 1974

[21] Appl. No.: 513,382

[30] Foreign Application Priority Data

Oct. 12, 1973 Japan ............................ 48-118675

[52] U.S. Cl. .............................................. 325/396

[51] Int. Cl.²............................................ H04B 1/06

[58] Field of Search ............ 325/395, 396, 466, 64, 325/302

[56] References Cited

UNITED STATES PATENTS

| | | | |
|---|---|---|---|
| 3,593,148 | 7/1971 | Cummings | 325/396 |
| 3,611,151 | 10/1971 | Fernandez | 325/396 |
| 3,778,721 | 12/1973 | Moran | 325/396 |
| 3,825,836 | 7/1974 | Pyles | 325/396 |

*Primary Examiner*—Albert J. Mayer

*Attorney, Agent, or Firm*—Hill, Gross, Simpson, Van Santen, Steadman, Chiara & Simpson

[57] ABSTRACT

A radio receiver is provided having a selectively tunable tuner section and a second tuner section which may be preset to receive the signal transmitted from a single transmitting station. A single output amplifier (including intermediate frequency and audio frequency) is included which is connected to a loud speaker. The first selectively tunable tuner may be connected to the amplifier either by a manually actuated switch or by a clock controlled timer actuated switch through a two position snooze switch. The preset tuner is connected to a timer controlled switch and through the snooze switch to the amplifier. When the snooze switch is turned on, it is not possible to connect the first tuner to the amplifier, but the second tuner is connected provided the timer has not opened the second tuner circuit.

7 Claims, 3 Drawing Figures

TIME CONTROLLED SWITCHING ARRANGEMENT FOR TWO TIMER RADIO RECEIVER

BACKGROUND OF THE INVENTION

1. Field of the Invention:

This invention relates generally to a radio receiver, and more particularly to a novel radio receiver having at least two tuners but only one amplifier.

2. Description of the Prior Art:

In radio broadcasting, it is known to have a short wave AM broadcasting, a medium wave AM broadcasting, and an FM broadcasting. Especially in FM broadcasting, a station which broadcasts various programs such as news, music, drama and the like, and a station which broadcasts time, weather, stock quotations and so forth are present.

It is known to have a radio receiver with one or two tuners. If the prior art radio receiver which receives broadcasting waves from a specific broadcasting station is intended to receive the broadcasting wave from another specific broadcasting station, its tuning knob which changes the frequency of the local oscillator in the receiver is rotated or a preset tuning button is depressed. When the radio receiver is once tuned to a specific station, it cannot receive another station without manually operating the tuning knob or preset button. In general, the broadcast contents of a specific station is repeatedly broadcast, aand for this reason it is troublesome to make its tuner tuned to another station.

Furthermore, a radio receiver with a clock and a timer has been proposed which receives a broadcast signal and produces a sound at a predetermined time through the use of a preset timer. Thereafter, even if a certain switch (a snooze switch) is operated to stop the radio receiver, it starts producing a sound again in a predetermined period of time. Such a prior art radio receiver could be changed in tuning from one station to another by merely rotating its tuning knob. Accordingly, if with the prior art radio receiver a specific broadcast signal is received for a predetermined time, such for example as 5 minutes, at least its tuning knob must be operated.

SUMMARY OF THE INVENTION

According to the present invention, there is provided a radio receiver which has a first tuner and a second tuner, switches for applying a received signal from the second tuner to an output amplifier circuit in place of that from the frist tuner and control means for holding the switch in that condition for a predetermined period of time and then returning the switch to its original position thereafter.

Accordingly, it is an object of this invention to provide a novel radio receiver.

It is another object of this invention to provide a novel radio receiver with a timer means which reproduces the output from a second tuner for a predetermined period of time without operating a tuning knob when the output from a first tuner is changed to the output of the second tuner.

It is a further object of this invention to provide a novel radio receiver which selects one of the outputs from first and second tuners without operating a tuning knob and hence is simple in operation.

It is a further object of this invention to provide a radio receiver which starts its signal reception at a time set by a timer and stopc its signal reception for a predetermined period of time, for example, 5 minutes, by operating a snooze switch and hence which can be utilized as an alarm clock.

It is a yet further object of this invention to provide a radio receiver with a clock, which receiver can receive, in addition to an ordinary broadcasting signal with the contents of various programs such as news, music, drama and so on, as in the case of FM broadcasting, a day and night broadcasting with one of time, weather, stock quotations for a predetermined period of time by operating a snooze switch.

It is still a further object of the present invention to provide a novel radio receiver and switching arrangement which has two separate tuner sections, the first of which is a conventional tuner which may be selectively tuned to a desired transmitting station, such for example, as an FM station, a medium wave AM station, a short wave AM station, etc. The second tuner station is preset to receive a single station. A first, manually operated switch is in the output of the first tuner. Second and third mechanically interconnected switches are provided which are activated by a clock driven timer, the second switch being normally open and the third switch being normally closed. A fourth two position switch is provided as a snooze switch. A single intermediate frequency amplifier, an amplifier and a loud speaker are also provided. The fourth switch is a two position switch arranged to connect the first tuner to the IFA and an amplifier when it is in its normally biased position when the first switch is also closed or when the second switch has been moved by the timer to its ON position. When the fourth switch is in its other position and the third switch is turned ON by the timer, the preset tuner is connected to the amplifier while the first tuner is disconnected. The fourth switch is actuated by a push button from its first to its second position and maintained there for a relatively short period of time either by an electronic timer circuit or by mechanical timer means. Thus, if the first tuner is on due to the first switch being turned ON, depression of the push button causes the preset tuner to be connected to the amplifier provided the third switch is in its ON state as determined by the timer.

The other objects, features and advantages of this invention will become apparent from the following description taken in conjunction with the accompanying drawings.

DESCRIPTION OF THE PREFERRED EMBODIMENT

Figure 1:
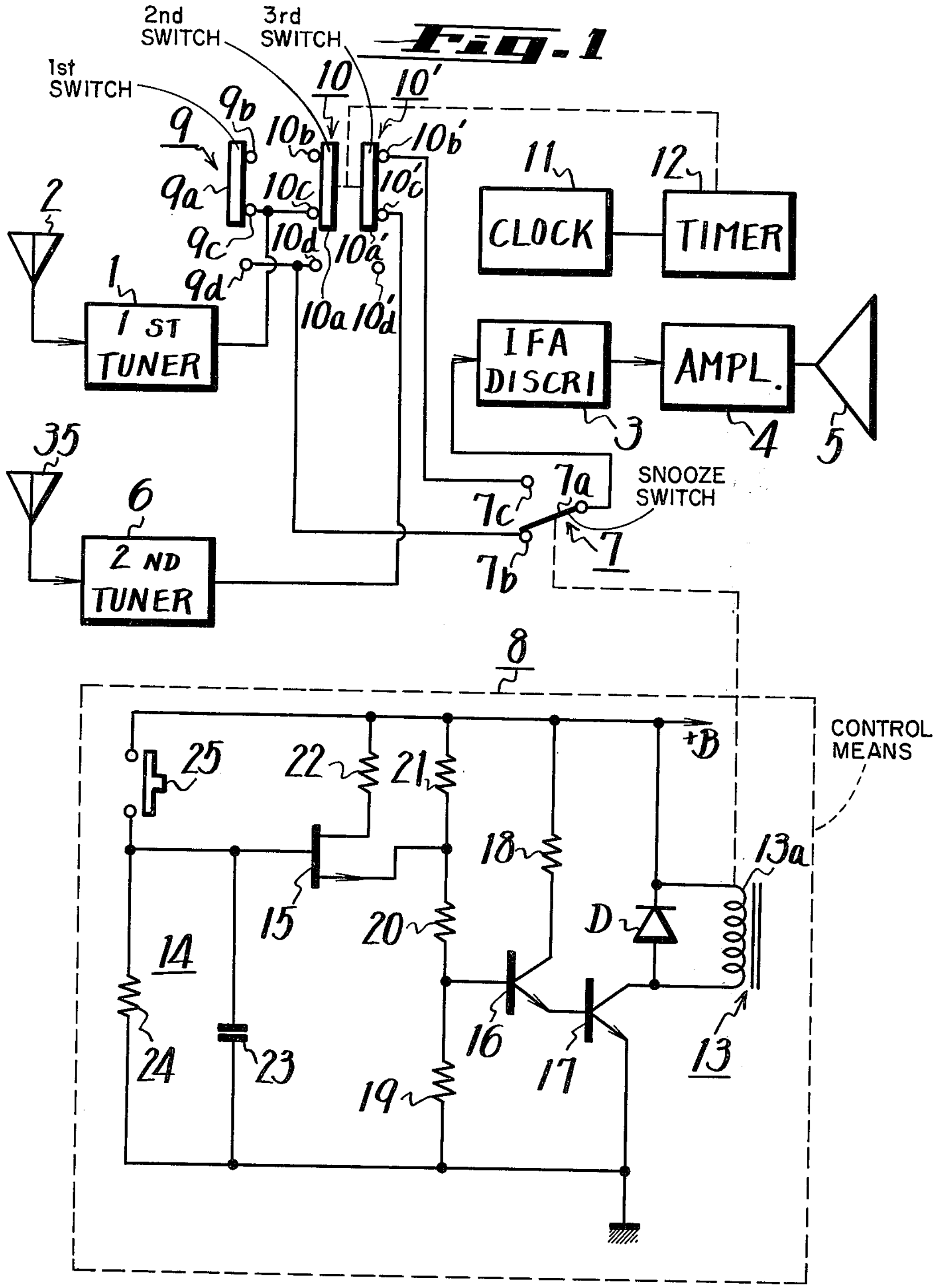
FIG. 1 is a block diagram illustrating an embodiment of the radio receiver with control means according to this invention.

With reference to FIG. 1, there is shown therein a radio receiver having a first tuner section 1 which receives transmitted signals through an antenna 2. There is also provided an intermediate frequency amplifier and discriminator circuit 3, an amplifier 4 and a loud speaker 5. As also shown in FIG. 1, there is a second tuner section 6 having an antenna 35 (which antenna may be used in common with the antenna 2). By way of example, the radio broadcast signals received by the first tuner section may be conventional programs with an AM or FM, while the second tuner section might be, for example, arranged to receive time, weather, stock quotations or the like, and is fixedly tuned to one station.

A first manual ON-OFF switch 9 by way of example, may be a slide switch having a movable contact *9a* and fixed contacts *9b*, *9c* and *9d*. As shown in FIG. 1, the fixed contact *9d* is electrically opened. Two additional switches 10 and 10′ are also provided having stationary contacts *10b*, *10c* and *10d* and *10′b*, *10′c* and *10′d*, respectively. Movable contacts *10a* and *10′a* are also provided. A clock 11 (such as a digital clock) has associated therewith a timer which is driven by the clock, and which timer is mechanically coupled to switches 10 and 10′ for shifting the movable contacts *10a* and *10′a*. The contacts 10 and 10′ are so coupled to the timer 10 that when one of them is placed in the ON position, the other is placed in the OFF position.

In the normal state, the movable contact *10a* of the switch 10 connects fixed contact *10b* to *10c* and the movable contact *10′a* of the switch 10′ connects the fixed contact *10′b* to *10′c*. When a preset time as determined by the timer 12 has arrived, the movable contact *10a* of the second switch 10 connects fixed contact *10c* to *10d* and the movable contact *10′a* of the switch ′ connects fixed contact *10′c* to *10′d*. In this embodiment, the timer 12 is so constructed that when one hour, for example, has passed from the set time, the switches 10 and 10′ are returned to their original state.

A fourth switch 7 is arranged to connect with fixed contact *10d* of switch 10 or fixed contact *10′b* of switch 10′ to the input side of the intermediate frequency amplifier discriminator circuit. The switch 7 is provided with a movable contact *7a* and two stationary contacts *7b* and *7c*, contact *7b* being connected to contact *10d* of switch 10 and contact *7c* being connected to contact *10′b* of switch 10′. Switch 7 is normally biased to a position where movable contact *7a* is in contact with stationary contact *7b*, but is arranged to be shifted to its other position where movable contact *7a* is in engagement with stationary contact *7c* by a relay 13 which forms a part of a control means 8, as will hereinafter be described. The control means 8 is designed, when activated, to hold contact *7a* in engagement with contact *7c* for a predetermined period of time and then automatically permits contact *7a* to return to its initial position in contact with contact *7b*.

In the embodiment of the invention shown in FIG. 1, the control means 8 includes a relay 13 which controls the switch 7 in its switching state. The period within which a relay coil *13a* is energized is controlled by a time constant circuit 14, transistors 15, 16 and 17 and their associated circuit elements. A diode D is connected across the relay coil *13a* and one end thereof is connected to a voltage source of +B, while its other end is grounded through the collector-emitter path of an NPN transistor 17. The transistor 16 is a control transistor, which is an NPN-type transistor in the illustrated embodiment, for the switching transistor 17. The emitter of the transistor 16 is connected to the base of the transistor 17 and the collector of the transistor 16 is connected through a resistor 18 to the voltage source +B. The base of the transistor 16 is grounded through a resistor 19 and connected to the voltage source +B through a series connection of resistors 20 and 21. An N-channel field effect transistor 15 serves to control the transistor 16. The source-drain path of the field effect transistor 15 and a resistor 22 connected in series thereto are connected to the resistor 21 in parallel to form a base bias circuit for the transistor 16. The bias circuit is so selected that when the field effect transistor 15 is turned ON, the transistor 16 goes ON, and consequently, the transistor 17 is ON.

The time constant circuit 14 is a discharging time constant circuit of a capacitor 23 and a resistor 24 and connected between the gate of the field effect transistor 15 and the ground. In the control means 8, a non-lock normally open switch 25 (which may be an ordinary mechanical switch or an electrostatic touch switch), is provided between the gate of the field effect transistor 15 and the voltage source +B.

The operation of the radio receiver depicted in FIG. 1 will be now described. When a preset time has not been reached by the timer 12, either because it has not been set or because the preset time has not as yet been reached, switch 10 is OFF and switch 10′ is ON. At this time, if the first switch 9 is turned ON by having movable contact *9a* make contact with its fixed contacts *9c* and *9d*, the received signal from the first tuner 1 is fed through the fixed and movable contacts *7b* and *7a* of switch 7 and the discriminator 3 through the output amplifier 4 to drive the speaker 5. In order to receive a signal from the second tuner 6 by the speaker 5 through the output amplifier 4, the non-lock normally open switch 25 of the control means 8 is temporarily made ON, which causes the capacitor 23 to be charged by the voltage source +B through the closed switch 25 to make the field effect transistor 15 ON immediately. Hence the transistors 16 and 17 are made ON to energize the relay coil *13a* of the relay 13 from the voltage source +B. Thus, the movable contact *7a* of switch 7 is switched to contact its fixed contact *7c*. At this time, the received output from the second tuner 6 is applied through the output amplifier 4 to the speaker 5. When a predetermined period of time has lapsed after the switch 25 is made ON (strictly speaking, the switch 25 is made ON once and then OFF), the terminal voltage across the capacitor 23 becomes lower than a predetermined value due to charging through the resistor 24. Then, the field effect transistor 15 becomes OFF and consequently the transistors 16 and 17 go OFF to stop the energization of the relay coil *13a* of the relay 13. As a result, the switch 7 returns to its original position with its movable contact *7a* in contact with the fixed contact *7b*. Accordingly, the received signal from the first tuner 1 is again sounded by the speaker 5 through the output amplifier 4 if contact *9a* bridges contacts *9c* and *9d*.

If it is assumed that the first switch 9 is made OFF and the timer 12 is set and that the set time has come, the switch 10 is made ON but the switch 10′ is made OFF. At this time, even if the switch 25 of the control means 8 is temporarily made ON, and the movable contact *7a* of switch 7 is switched over to contact with the fixed contact *7c*, no received signal is fed to the output amplifier 4. After the predetermined period of time has lapsed from the time when the switch 25 is made ON, the movable contact *7a* of the fourth switch 7 contacts with the fixed contact *7b* and hence a received signal from the first tuner 1 may be fed through the amplifier 4 to the speaker 5 when switch 9 is made ON.

Another embodiment of the control means 8 will be now described with reference to FIG. 2. In the figure, reference numeral 7 indicates corresponding numbered switch shown in FIG. 1, and 28 is an operating button which is inserted into a panel 29 in a manner to be freely moved. A lip 28a is provided on the bottom of the button 28 which serves to move the movable contact 7a of the switch 7 up so as to separate the movable contact 7a from the fixed contact 7c, and to cause it to make contact with the fixed contact 7b. Engaging members 28b are provided on the operating button 28 on the outer side of panel 29. A bellows 30 made of a resilient material such as rubber or the like is fixedly mounted on a base 31. This bellows is provided with an orifice 30a.

Figure 2:
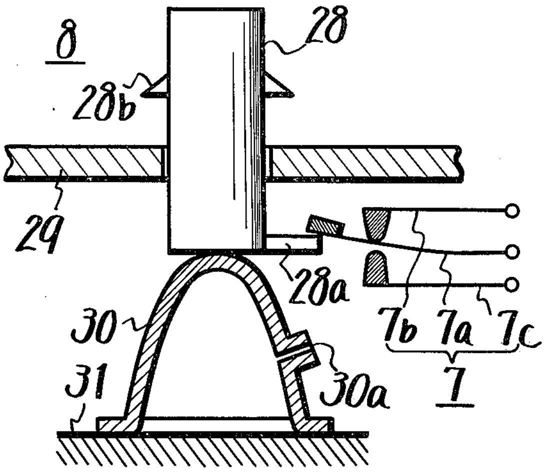
FIG. 2 is a cross-sectional view of another embodiment of the control means used in the radio receiver of the invention.

When the control means 8 is in a normal state, the bellows 30 of the control means 8 depicted in FIG. 2 has a predetermined contour which, due to its inherent resiliency, urges the operating button 28 upwardly, so that the movable contact 7a of the switch 7 is raised up by the lip 28a of the operating button 28 to separate contact 7a from contact 7c and permit contact 7a to engage contact 7b.

Figure 3:
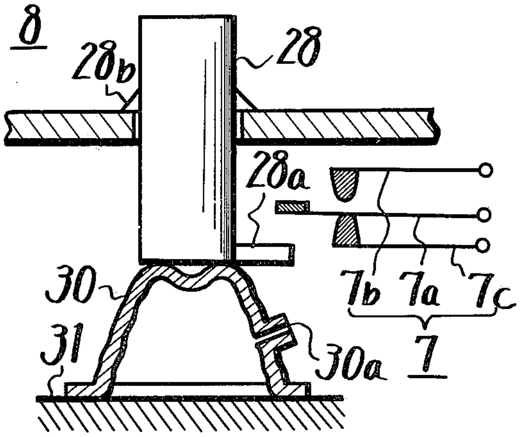
FIG. 3 is a cross-sectional view showing the operating state of the control means depicted in FIG. 2.

The operation of the control means 8 will be now described. If the operating button 28 is pushed down to such an extent that its projections 28b engage the face of panel 29, the air in the bellows 30 is forced out through the orifice 30a, by the bellows 30 being depressed, as shown in FIG. 3. The projection 28a of the operating button 28, having moved downwardly, it permits the movable contact 7a to be separated from contact 7b. As a result, the movable contact 7a contacts the fixed contact 7c. If the operating button 28 is released from the above state, air returns into the bellows 30 through the orifice 30a gradually and hence the bellows 30 returns to its original state, due to the inherent resiliency of the material of which it is made. This gradually raises the operating button 28. Thus, the projection 28a of the operating button 28 raises the movable contact 7a to separate it from fixed contact 7c and to connect the movable contact 7a with the fixed contact 7b.

Since the radio receiver of this invention has the timing means to switch the first and second tuners for a predetermined period of time, one of the programs of the specific stations can be received through the second tuner by a switching operation for a predetermined period of time only, as described previously.

Further, with this invention, the snooze mechanism of the radio receiver which has the functions of alarming and snoozing is also used as the timing control device, so that this invention is simple in contruction and cheap.

It will be obvious that many changes and modifications could be effected by one skilled in the art without departing from the spirit and scope of the novel concepts of this invention.

I claim as my invention:

1. A radio receiver comprising:

a. a first tuner section manually selectable to tune in different transmitting stations;

b. a second tuner section preset to a single transmitting station;

c. an amplifier;

d. a loud speaker connected to the output of said amplifier;

e. switching means for connecting one or the other of said tuner sections to said amplifier, said switching means including:

a two position snooze switch normally biased to a non-snooze position by engaging a first stationary contact, a first main switch serially connecting said first tuner section through said first stationary contact of said snooze switch to said amplifier, second and third switches ganged together, the second being normally open and the third being normally closed, a timing means, said second and third switches being shiftable by said timer between a first normal position and a second position, said first tuner section being connected to said amplifier through the second position of said second switch and the non-snooze positon of said snooze switch, said snooze switch being biased to its non-snooze position, and means for retaining it in its snooze position for a predetermined period of time after it has been initially actuated.

2. A radio receiver comprising:

a. a first tuner for receiving a plurality of broadcasting signals and for tuning in a desired broadcasting signal;

b. a preset tuner for tuning in a predetermined broadcasting signal;

c. switch means for selecting the output signal derived from one of said tuners, said switch means normally being connected to said first tuner so as to derive the output signal of said first tuner;

d. an amplifier connected to said switch means for amplifying an output signal passing through said switch means;

e. a timing means; and f. control means for connecting said switch means to said preset tuner for a predetermined period of time as determined by said timing means, after disconnecting said first tuner.

3. A radio receiver as set forth in claim 2, wherein said switch means comprises a first fixed contact connected through a manual switch to said first tuner, a second fixed contact connected through one of said switches which are made ON and OFF by said timing means to said preset tuner, and a movable contact switched over by said control means to be connected from said first fixed contact to said second fixed contact.

4. A radio receiver as set forth in claim 3, which includes another switch which is operated in ganged relationship with said switch operated by said timing means and connected in parallel to said manual switch.

5. A radio receiver as set forth in claim 3, wherein said control means comprises a switch, a charging circuit connected to said switch, a discharging circuit connected to said charging circuit, and a relay circuit connected to said discharging circuit, said relay circuit being connected to a movable contact of said switch means.

6. A radio receiver as set forth in claim 3, wherein said control means comprises a bellows with an orifice and a means for selectively depressing said bellows to force air outwardly through said orifice, said depressing means being connected to a movable contact of said switch means, said movable contact being normally biased toward one of said fixed contacts and being moved to the other contact by expansion of the bellows caused by air entering said orifice upon release of the depressing means.

7. A radio receiver comprising:

a. first and second tuners;

b. an output amplifier;

c. a first manual ON-OFF switch;

d. a timer;

e. second and third ON-OFF switches which are controlled by said timer in ganged relationship to be reverse with respect to each other;

f. a fourth change-over switch having two fixed contacts and a movable contact;

g. a timing means;

h. control means for holding the switched state of said fourth switch for a predetermined period of time as determined by said timing means and thereafter returning the same;

i. means for connecting the output side of said first tuner through a parallel circuit of said first and second switches to one of said fixed contacts of said fourth switch;

j. means for connecting the output side of said second tuner through said third switch to the other fixed contact of said fourth switch; and k. means for supplying an output signal at said movable contact of said fourth switch to said output amplifier circuit, said movable contact of said fourth switch being normally biased against said one fixed contact and to said other fixed contact for a predetermined period of time after it has been moved against said other fixed contact.

* * * * *